(12) United States Patent
Li et al.

(10) Patent No.: US 12,099,806 B2
(45) Date of Patent: Sep. 24, 2024

(54) PLACE RECOGNITION METHOD BASED ON KNOWLEDGE GRAPH INFERENCE

(71) Applicant: SOUTHEAST UNIVERSITY, Nanjing (CN)

(72) Inventors: Xinde Li, Nanjing (CN); Pei Li, Nanjing (CN); Changyin Sun, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 323 days.

(21) Appl. No.: 17/701,137

(22) Filed: Mar. 22, 2022

(65) Prior Publication Data

US 2022/0215175 A1 Jul. 7, 2022

Related U.S. Application Data

(63) Continuation of application No. PCT/CN2020/141444, filed on Dec. 30, 2020.

(30) Foreign Application Priority Data

Dec. 24, 2020 (CN) .......................... 202011556111.2

(51) Int. Cl.
*G06F 40/30* (2020.01)
*G06F 40/268* (2020.01)
*G06F 40/44* (2020.01)
*G06N 5/02* (2023.01)
*G06N 5/04* (2023.01)

(52) U.S. Cl.
CPC ............ *G06F 40/30* (2020.01); *G06F 40/268* (2020.01); *G06F 40/44* (2020.01); *G06N 5/02* (2013.01); *G06N 5/04* (2013.01)

(58) Field of Classification Search
None
See application file for complete search history.

(56) References Cited

U.S. PATENT DOCUMENTS 10,679,133 B1 * 6/2020 Mathur .................... G06N 5/02
2022/0180065 A1 * 6/2022 Liu .......................... G06N 3/08

* cited by examiner

*Primary Examiner* — Quynh H Nguyen
(74) *Attorney, Agent, or Firm* — Muncy, Geissler, Olds & Lowe, P.C.

(57) ABSTRACT

The present disclosure discloses a place recognition method based on knowledge graph inference; and provides, on the basis of giving a knowledge graph construction method in the place field, a recognition method of general places that is based on knowledge graph inference and can integrate various heterogeneous environmental information, including the following steps: (1) extracting main clues such as the main items that make up the place, the produced events, and the spatial structure from various heterogeneous information, and describing these clues in natural language text; (2) screening the foregoing descriptions by using natural language processing methods, to form place description entities; (3) constructing a knowledge graph in the place field according to the occurrence frequencies of the description entities in an actual environment; and (4) implementing inference and classification based on the knowledge graph by using a Deep Neural Network (DNN), to give a final recognition result. The present disclosure improves the place recognition accuracy by means of knowledge graph inference, and greatly improves semantic interpretability in the place recognition process.

7 Claims, 2 Drawing Sheets

PLACE RECOGNITION METHOD BASED ON KNOWLEDGE GRAPH INFERENCE

CROSS REFERENCE TO RELATED APPLICATIONS

This application is a Continuation of co-pending Application No. PCT/CN2020/141444, filed on Dec. 30, 2020, for which priority is claimed under 35 U.S.C. § 120; and this application claims priority of application Ser. No. 202011556111.2 filed in China on Dec. 24, 2020 under 35 U.S.C. § 119, the entire contents of all of which are hereby incorporated by reference.

TECHNICAL FIELD

The present disclosure relates to a place recognition method based on knowledge graph inference, which belongs to the technical field of artificial intelligence and knowledge graphs.

BACKGROUND

Place perception refers to automatically processing and analyzing the environmental information such as vision, sound, distance, natural language, etc., by means of artificial intelligence, and determining and recognizing the specific place semantics (e.g., kitchen, street, etc.) that the environment carries. Place perception not only helps to understand the overall semantic content of the environmental information, but also provides a basis for place-related human-computer interaction tasks. Therefore, place recognition is of great importance to automatic understanding of the environment by an intelligent device and improvement of the intelligent level of human-computer interaction.

The current place recognition technologies mostly use images or distances (by means of infrared rays, ultrasonic waves, etc.) as recognition clues, and learn and train a Deep Neural Network (DNN) model through a huge quantity of samples, so that the network model can give the place category corresponding to the environmental information. Such methods mainly have the following shortcomings: 1. It is required to design different model methods according to different information source types, and integration of heterogeneous information cannot be realized, thus lacking unified inference and failing to ensure the recognition accuracy. 2. The DNN belongs to an end-to-end model, and therefore has no intermediate results of the inferring process, so that a large number of semantic cues related to the place understanding task are lost.

On the other hand, a knowledge graph is a semantic network that can explicitly reveal the relationship between knowledge, and can formally describe all kinds of things and their interrelation. This technology helps knowledge in the relevant fields to be created, shared, updated, inferred, etc., and to be effectively understood directly by people. However, the current knowledge graphs are all constructed independently by different users based on their own application fields, and there is still an absence of construction and inferring methods of knowledge graphs targeted for the place filed. Therefore, there is an urgent need for a novel technical solution to solve the foregoing technical problems.

SUMMARY

To overcome the shortcomings or deficiencies in the prior art, the present disclosure provides a place recognition method based on knowledge graph inference, which integrates environmental information of various places by means of knowledge graph technology, can effectively solve the problem of a low recognition rate of a recognition method based on homogeneous information, and further can enrich the semantics of inference results, thus improving the human-computer interaction and other place-related intelligent tasks.

To achieve the foregoing objective, the present disclosure adopts the following technical solution: A place recognition method based on knowledge graph inference is provided, which includes the following steps:

Step 1) Acquisition of Basic Semantic Data
  the basic semantic data mainly describing items contained in a specific place, events, and special semantic concepts associated with the place, and there being the following two acquisition ways: during construction of a place knowledge graph and training of an inference model, annotating various information manually by using natural language description, including images, sound, distances, voice, etc., collected in a place environment, so as to obtain the basic semantic data and a corresponding place category; and on the other hand, in a place recognition and inference process, automatically generating the semantic data by an existing semantic generation model according to types of heterogeneous information;

Step 2) Generation of Place Description Entities
  by using natural language processing methods such as text segmentation, removal of stop words, entity extraction, lemmatization, and manual screening, preprocessing the basic semantic data, where natural language text obtained after screening contains description entities in the place knowledge graph;

Step 3) Construction of the Place Knowledge Graph
  counting the occurrence frequencies of the place description entities in an actual application environment, to obtain a frequency of each description entity in a specific place, and then performing normalization to obtain a probability value, to finally form the place knowledge graph having a basic triple structure of "description entities-place categories-probability values"; and Step 4) Inference from the Place Knowledge Graph
  learning the knowledge graph by using a DNN, where its objective task is to perform training according to triple sets of the knowledge graph, so that the DNN has a function of inferring the "place category" according to a knowledge set of "description entities-probability values"; during implementation of inference, automatically extracting description entities from a place information source according to steps 1) and 2), and further performing entity matching with the knowledge graph in step 3); and then making inference by using a well-trained DNN from a knowledge set obtained after the matching, thus realizing place recognition.

Preferably, the acquisition of the basic semantic data in step 1) includes the following sub-steps:

1-1) in an actual application environment, the place information being collected by an intelligent device via a sensor, and original information being expressed with images, videos, sound, distances, etc.; first, describing the foregoing information in natural language by means of manual annotation, where description content includes semantic concepts such as names of things, events, and human behavior or states that are contained in the information, so as to form the basic semantic data; and 1-2) in the inference process, automatically generating the basic semantic data by the existing semantic generation network according to specific information types, where training data for the network is provided in sub-step 1-1).

Preferably, the generation of the place description entities in step 2) includes the following sub-steps:

after acquisition of the basic semantic data in step 1), requiring preprocessing by using natural language processing methods: first, segmenting the semantic data to obtain word units each having a minimal semantic concept; then, performing word deletion according to a stop word list; further performing entity extraction for the screened word units, where an extraction principle is: reserving word units each having a minimal semantic concept according to the thing names, events, actions, or states, such units generally having the attributes of nouns or verbs and being able to affect the judgment on the place category; and finally, performing lemmatization for the extracted entities, to lemmatize words in terms of verb tense, person, and noun plural, where through the foregoing steps, a description entity dictionary is formed, which can be stored, added, deleted, and modified.

Preferably, the construction of the place knowledge graph in step 3) includes the following sub-steps:

first, collecting sample statistics on the number of occurrences of each description entity in an actual application environment according to the description entity dictionary obtained in step 2). Let $n_{i,j}$ denote the number of occurrences of the i-th description entity in the dictionary in all samples regarding category-j places and let $m_j$ denote a total number of the samples regarding the category-j places, to obtain the following calculation formula of a description entity frequency value $f_{i,j}$: $f_{i,j}=n_{i,j}/m_j$; if the i-th description entity does not occur in the samples regarding the category-j places in the statistical process, assigning a minimal value to the frequency $f_{i,j}$, that is, $f_{i,j}=\sigma(\sigma<10^{-3})$; performing normalization for frequency values of all the description entities in places of the same category, that is, $$\sum_i F(f_{i,j}) = 1,$$

where the function $F(\cdot)$ denotes a normalization method, to finally obtain an entity occurrence probability value $p_{i,j}$, and preferably, $$\sum_i p_{i,j} = 1$$

can be established by using $$p_{i,j} = \frac{f_{i,j}}{\sum_i f_{i,j}},$$

to calculate the probability value; and thus, constructing the place knowledge graph, where a basic triple structure thereof is "description entities-place categories-probability values", which is specifically expressed as: the i-th description entity-place category j-occurrence probability $p_{i,j}$; in addition, triples corresponding to the probability values of $p_{i,j}<10^{-2}$ are not recorded in the knowledge graph, and corresponding modification or deletion is also synchronously made in the description entity dictionary in step 2); and moreover, two new entities: "placeholder" and "unknown character", are added to the description entity dictionary in step 2), where the former one does not have any semantic concept and is only used for data padding in an inference model; and the latter one is semantic data acquired in step 1), is not stored in the description entity dictionary in step 2), and indicates that the entity concept is unknown.

Preferably, the inference from the place knowledge graph in step 4) includes the following sub-steps:

4-1) in the training process, combining the entity dictionary and the place categories into a new dictionary, which is denoted by a one-hot code vector; and designing a DNN inference model by using a set of "description entities-probability values" of the samples as the input and the "place categories" as the output; and 4-2) in the inference process, performing entity matching between the set of "description entities" of the samples acquired in step 2) and the knowledge graph constructed in step 3), to obtain a set of "description entities-probability values"; and then inputting the set into the well-trained inference model in sub-step 4-1), to finally obtain place category knowledge.

Preferably, the description entity dictionary includes the following two sets: an object set and an action state set, where elements in the object set are words corresponding to real objects, and elements in the action state set are words corresponding to interactions between humans and objects or between humans, and certain states of humans or produced events; and other semantic words are not included in the description entity dictionary.

Preferably, the DNN inference model has the following structure or steps:

Preferably, the neural network structure at least includes: an embedded vector fully connected layer, used for realizing mapping from a one-hot code to a dense vector; a recurrent neural network or its variant structure, used for realizing integration and fusion of the set of "description entities-probability values"; and a softmax layer, used for calculating a classification probability of place categories. Other functional structures used for feature extraction, dimension increase/decrease, and nonlinear mapping are not described, but are still within the scope of claims of the present disclosure.

More preferably, the training process for optimizing the inference model at least includes: a cross entropy loss function, used for realizing improvement of model classification performance; and a triplet loss function, used for improving a vector representation capability of the description entities, so that the Euclidean distance between the word embedding vectors of description entity corresponding to places of the same category is as close as possible, and the Euclidean distance between the word embedding vectors of description entity corresponding to places of different categories is as far as possible.

Compared to the prior art, the present disclosure has the following advantages: The present disclosure provides a place recognition method based on knowledge graph inference, which first gives a construction method of a place knowledge graph, thus solving the current problem of the absence of knowledge graphs in the place recognition and understanding field; and secondly, can well solve the problems such as low recognition accuracy, poor semantic interpretability, inability to visualize the inference process, and lack of comprehensive inference for multi-source and heterogeneous information in the current place recognition methods. Further, the knowledge graph in the place field can provide engineering foundation for intelligent tasks of intelligent robots, such as task planning and decomposition, human-robot interaction, and speech understanding. The method provided by the present disclosure has simple steps, is easy to implement, and can achieve a good place recognition effect.

DETAILED DESCRIPTION OF THE EMBODIMENTS

Figure 1:
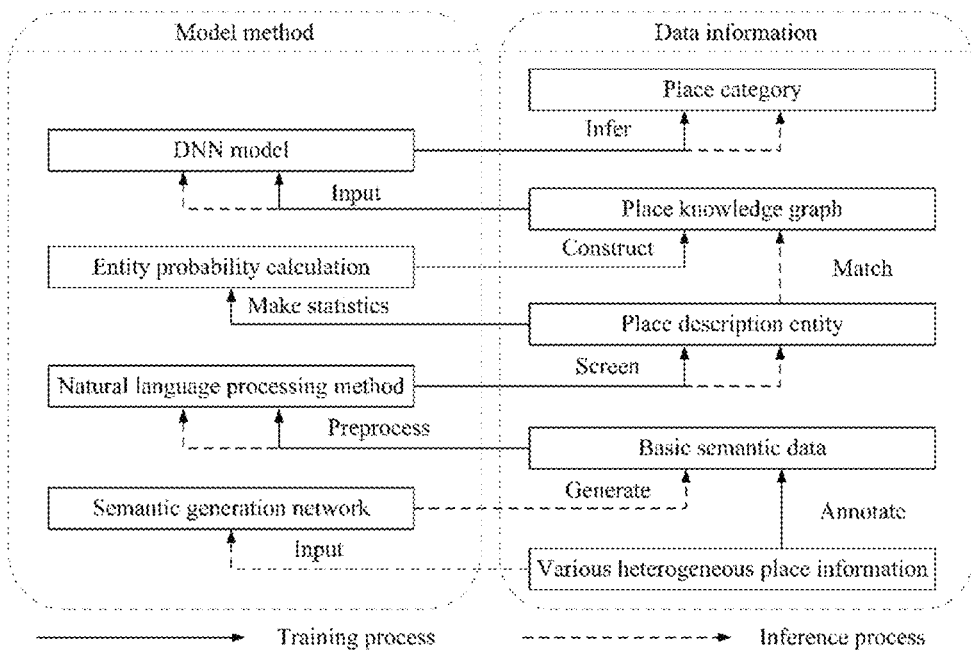
FIG. 1 is a schematic framework diagram of a place recognition method based on knowledge graph inference of the present disclosure.

In order to make the present disclosure more comprehensible, the present disclosure is described in detail below with reference to preferred embodiments and the accompanying drawings. The accompanying drawings of the present disclosure merely give exemplary descriptions and should not be considered as limiting the present disclosure. For those skilled in the art, it is understandable that some well-known structures in the drawings and their descriptions may be omitted.

Embodiment 1: A Place Recognition Method Based on Knowledge Graph Inference is Provided, which Includes the Following Steps Step 1) Acquisition of Basic Semantic Data
  The basic semantic data mainly describes items contained in a specific place, events, and special semantic concepts associated with the place, and there are the following two acquisition ways: During construction of a place knowledge graph and training of an inference model, various information, including images, sound, distances, voice, etc., collected in a place environment is annotated manually by using natural language description, so as to obtain the basic semantic data and a corresponding place category. On the other hand, in a place recognition and inference process, the foregoing semantic information is automatically generated by an existing semantic generation model according to types of heterogeneous information.
Step 2) Generation of Place Description Entities
  By using natural language processing methods such as text segmentation, removal of stop words, entity extraction, lemmatization, and manual screening, the basic semantic data is preprocessed, and natural language text obtained after screening contains description entities in the place knowledge graph.
Step 3) Construction of the Place Knowledge Graph
  The occurrence frequencies of the place description entities in an actual application environment are counted, to obtain a frequency of each description entity in a specific place, and then normalization is performed to obtain a probability value, to finally form the place knowledge graph having a basic triple structure of "description entities-place categories-probability values".
Step 4) Inference from the Place Knowledge Graph
  The knowledge graph is learned by using a DNN, where its objective task is to perform training according to triple sets of the knowledge graph, so that the DNN has a function of inferring the "place category" according to a knowledge set of "description entities-probability values". During implementation of inference, it is required to automatically extract description entities from a place information source according to steps 1) and 2), and further entity matching with the knowledge graph in step 3) is performed; and inference is made by using a well-trained DNN from a knowledge set obtained after the matching, thus realizing place recognition.

The acquisition of the basic semantic data in step 1) includes the following sub-steps:
  1-1) In an actual application environment, the place information is collected by an intelligent device via a sensor, and original information is expressed with images, videos, sound, distances, etc. First, the foregoing information is described in natural language by means of manual annotation, where description content includes semantic concepts such as names of things, events, and human behavior or states that are contained in the information, so as to form the basic semantic data.
  1-2) In the inference process, the basic semantic data is automatically generated by the existing semantic generation network according to specific information types, where training data for the network is provided in sub-step 1-1).

The generation of the place description entities in step 2) includes the following sub-steps:
  After acquisition of the basic semantic data in step 1), preprocessing is required by using natural language processing methods: First, the semantic data is segmented to obtain word units each having a minimal semantic concept. Then, word deletion is performed according to a stop word list. Further, entity extraction is performed for the screened word units, where an extraction principle is: reserving word units each having a minimal semantic concept according to the thing names, events, actions, or states; and such units generally have the attributes of nouns or verbs and are able to affect the judgment on the place category. Finally, lemmatization is performed for the extracted entities, to lemmatize words in terms of verb tense, person, and noun plural. Through the foregoing steps, a description entity dictionary can be formed, which can be stored, added, deleted, and modified.

The construction of the place knowledge graph in step 3) includes the following sub-steps:
  First, sample statistics on the number of occurrences of each description entity in an actual application environment are collected according to the description entity dictionary obtained in step 2). Let $n_{i,j}$ denote the number of occurrences of the i-th description entity in the dictionary in all samples regarding category-j places and let $m_j$ denote a total number of the samples regarding the category-j places, to obtain the following calculation formula of a description entity frequency value $f_{i,j}$: $f_{i,j}=n_{i,j}/m_j$. If the i-th description entity does not occur in the samples regarding the category-j places in the statistical process, a minimal value is assigned to the frequency $f_{i,j}$, that is, $f_{i,j}=\sigma(\sigma<10^{-3})$. Normalization is performed for frequency values of all the description entities in places of the same category, that is, $$\sum_i F(f_{i,j}) = 1,$$

where the function F(•) denotes a normalization method, to finally obtain an entity occurrence probability value $p_{i,j}$. Preferably, $$\sum_i p_{i,j} = 1$$

can be established by using $$p_{i,j} = \frac{f_{i,j}}{\sum_i f_{i,j}},$$

to calculate the probability value. Thus, the place knowledge graph can be constructed, and a basic triple structure thereof is "description entities-place categories-probability values", which is specifically expressed as: the i-th description entity-place category j-occurrence probability $p_{i,j}$. In addition, triples corresponding to the probability values of $p_{i,j}<10^{-2}$ are not recorded in the knowledge graph, and corresponding modification or deletion is also synchronously made in the description entity dictionary in step 2). Moreover, two new entities: "placeholder" and "unknown character", are added to the description entity dictionary in step 2), where the former one does not have any semantic concept and is only used for data padding in an inference model; and the latter one is semantic data acquired in step 1), is not stored in the description entity dictionary in step 2), and indicates that the entity concept is unknown.

The inference from the place knowledge graph in step 4) includes the following sub-steps:
4-1) In the training process, the entity dictionary and place categories are combined into a new dictionary, which is denoted by a one-hot code vector; and a DNN inference model is designed by using a set of "description entities-probability values" of the samples as the input and the "place categories" as the output.
4-2) In the inference process, entity matching is performed between the set of "description entities" of the samples acquired in step 2) and the knowledge graph constructed in step 3), to obtain a set of "description entities-probability values"; and then the set is input into the well-trained inference model in sub-step 4-1), to finally obtain place category knowledge.

Specific embodiment: The framework of a place recognition method based on knowledge graph inference provided by the present disclosure is shown by FIG. 1, which includes a training process and an inference process. As shown in FIG. 1, the training process mainly includes the following four steps:
1) acquiring basic semantic data from various heterogeneous place information by means of manual annotation, which is mainly the semantics of things covered by place information described in natural language; and by using the acquired data as a data sample, designing a semantic generation model;
2) preprocessing and screening the basic semantic data by using natural language processing methods, to acquire description entity knowledge of a place;
3) by means of sample statistics in an actual application environment, acquiring an occurrence probability of each description entity, thus forming a place knowledge graph having a basic triple structure of "description entities-place categories-probability values"; and
4) with reference to the place knowledge graph, designing a DNN inference model by using a set of "description entities-probability values" as the input and the "place categories" as the output, for sample learning and network parameter training.

Based on completion of the training process, the inference process mainly includes the following four steps:
1) generating basic semantic data from various heterogeneous place information by using the semantic generation model;
2) preprocessing and screening the basic semantic data by using natural language processing methods, to acquire description entity knowledge of a place;
3) matching the description entities with the place knowledge graph, to obtain a set of "description entities-probability values" of sample information; and
4) inputting the set of "description entities-probability values" into the inference model, to obtain information about "place categories".

Specific Experimental Procedure and Results of Embodiment 1

The implementation of the place recognition method based on knowledge graph inference of the present disclosure is further described below with reference to specific experiments and the accompanying drawings. This embodiment merely describes preferred examples of the present disclosure and should not be construed as limiting the present disclosure.

The place information data used in the experiment of the present disclosure comes from a large-scale scene image database established by J. Xiao et al. (SUN dataset: https://vision.cs.princeton.edu/projects/2010/SUN/, 2020 Nov. 25; and the corresponding literature is SUN database: Large-scale scene recognition from abbey to zoo[C]//Computer Vision & Pattern Recognition. IEEE, 2010. by Xiao J, Hays J, Ehinger K A, et al.). This database contains a total of about 100,000 RGB images in 397 categories, and each scene contains at least 100 image samples, where about 16,000 images have been manually annotated, with English words to mark the main items contained therein. Experimental method: This experiment selects images of 14 categories of indoor places for experimental verification, and reference can be made to Table 1 for the specific categories of the places and the numbers of corresponding samples. Because the numbers of samples of different place categories are different, test samples are randomly selected from samples corresponding to each place category, where the selected samples account for 10% of a total of the samples corresponding to this place category, and the remaining samples are used as training samples. In order to estimate the effectiveness of the algorithm proposed by the present disclosure, this experiment takes a recognition rate as an estimation means. A calculation method of the recognition rate is: $A=n_r/N\times100\%$, where A denotes the recognition rate, $n_r$ denotes the number of correctly recognized ones in the test samples, and N denotes a total number of the test samples.

1. Experimental Procedure 1.1 Acquisition of Basic Semantic Data

Because pictures in the selected data set already contain natural language descriptions obtained by means of manual annotation, the basic semantics in this experiment are directly extracted from the original data. On the other hand, during actual application of the present disclosure, because samples to be tested in the inference process do not contain natural language descriptions, it is required to design an additional semantic generation module used for, for example, target detection, image description, semantic segmentation, etc.; and the related technology is not within limitations of the present disclosure. Therefore, the semantic generation technology is not introduced in this experimental procedure, and such technology is considered to fall within the scope known to scientific and technical personnel in this technical field. To briefly introduce the principle of the present disclosure, in the test process, the original natural language descriptions of the data set are still used as the basic semantic data for inference. In addition, this experiment selects images as the information type, which is only for reference and description; and operations can be executed for other information types according to the description of the present disclosure.

Let a training picture sample I be composed of n basic semantic descriptions $d_i$(i=1, 2, . . . , n) and a place label l, which can be expressed as a set: I={$(d_i,l)|d_i \in D, l \in L$, i=1, 2 . . . , n}, D denoting natural language knowledge used by humans to describe places, and L denoting all place categories that can be recognized by the knowledge graph. This set participates in the following inference process as the basic semantic data.

1.2 Generation of Place Description Entities

The basic semantic data is preprocessed by using natural language processing methods. The specific steps are described below with reference to specific instances:

1) First, the basic semantic description is segmented according to human semantic knowledge, that is, $d_i=\{s_j^i|j=1, 2, \ldots, m\}$, where $s_j^i$ denotes the smallest semantic unit that indicates a particular concept. For example, a natural language description of a certain picture sample is "A man is eating that red apple", and after a segmentation step, a set {A, man, is, eating, that, red, apple} is obtained.

2) Afterwards, word deletion is performed according to a stop word list, to remove a word meaningless for description of the sample. For the instance in the previous step, {that} can be removed because it is meaningless for description of the sample in this instance.

3) Finally, part-of-speech tagging is performed by using the entity extraction technology, and word units each having a minimal semantic concept that describes objects, events, and actions are reserved, where such units generally have the attributes of nouns or verbs and are able to affect the judgment on the place category. Thus, place description entities I={$w_j^i \in d_i|j=1, 2, \ldots, k, k<m$} are generated. With reference to the previous instance, the finally reserved place description entities are {man, eating, apple}.

1.3 Construction of a Place Knowledge Graph

With reference to the place description entity set obtained in step 1.2, it is required to construct a place knowledge graph according to the following steps:

1) Duplicates in the place description entity sets of all samples are eliminated to form a description entity dictionary, where this dictionary can be stored, modified, deleted, and added, and is a basic element of the knowledge in the knowledge graph. In addition, it is required to add two new entities: "placeholder" and "unknown character" to the description entity dictionary, where the former one does not have any semantic concept and is only used for data padding in an inference model; and the latter one is a unit not stored in the description entity dictionary and indicates that the entity concept is unknown.

2) The number of occurrences of each unit in the dictionary in an actual application environment is counted. Let $n_{i,j}$ denote the number of occurrences of the i-th description entity in the dictionary in all samples regarding category-j places and let $m_j$ denote a total number of the samples regarding the category-j places, to obtain the following calculation formula of a description entity frequency value $f_{i,j}$: $f_{i,j}=n_{i,j}/m_j$. If the i-th description entity does not occur in the samples regarding the category-j places in the statistical process, a minimal value is assigned to the frequency $f_{i,j}$, that is, $f_{i,j}=\sigma(\sigma<10^{-3})$.

3) Normalization is performed for frequency values of all the description entities in places of the same category, that is, $$\sum_i p_{i,j} = 1$$

is established by using $$p_{i,j} = \frac{f_{i,j}}{\sum_i f_{i,j}},$$

to obtain the entity occurrence probability value $p_{i,j}$.

4) The place knowledge graph is constructed, and a basic triple structure thereof is "description entities-place categories-probability values", which is specifically expressed as: the i-th description entity-place category j-occurrence probability $p_{i,j}$. In addition, triples corresponding to the probability values of $p_{i,j}<10^{-2}$ are not recorded in the knowledge graph. That is, such description entities can be deleted because their occurrence likelihood is rather low in actual application. Then, corresponding modification or deletion is also synchronously made in the description entity dictionary.

1.4 Inference from the Place Knowledge Graph

Figure 2:
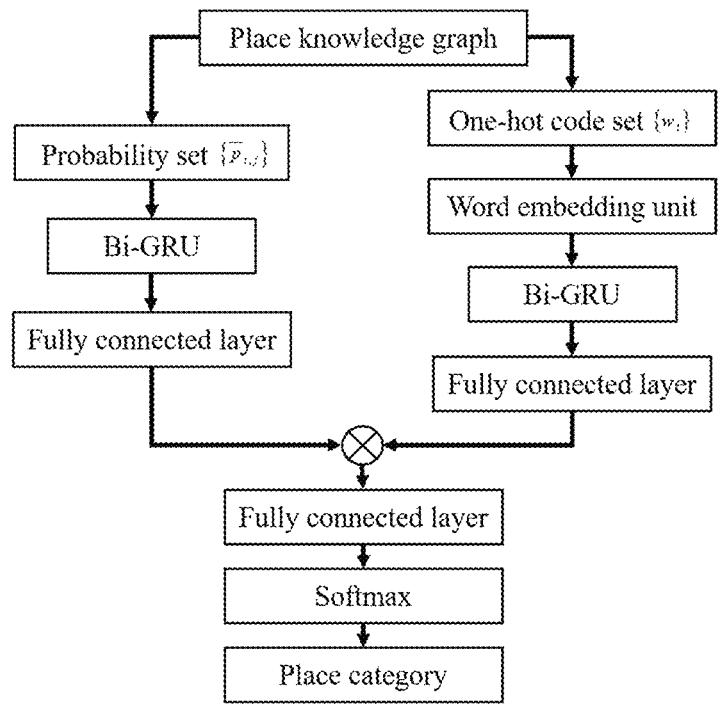
FIG. 2 is a diagram of a DNN model for knowledge graph inference.

The inference process has two parts: inference model training and inference model test, where a basic structure of the inference model is shown by FIG. 2. It should be noted that, this neural network model is merely an experimental preferred result of the present disclosure and should not be construed as limiting the present disclosure. Other inference models or methods shall also be regarded as falling within the scope of the present disclosure.

The neural network model is formed by an input layer, a word embedding unit, a bi-gated network layer, a fully connected layer, a fusion layer, and a classification layer.

The description entities and the probability values $p_{i,j}$ in the knowledge graph constitute the input layer. The description entities and the place categories are denoted by a one-hot code vector $w_i$, and in the vector, positions corresponding to the entity dictionary are 1 and other positions are 0. The word embedding unit is a lookup table consisting of fully connected layers; and can map the one-hot code vector to a dense real-number vector, which is referred to as an embedding vector. The input dimension of the fully connected layer is a dictionary capacity, and its output dimension is manually set and less than the dictionary capacity. In this experiment, the dictionary capacity is 412 and the dimension of the embeddding vector is 256. There are two Bi-Gated Recurrent Units (Bi-GRUs), one of which receives the probability values and the other one receives the dense vector of the description entities. The hidden-layer dimensions of the gated units are manually set, which are 32 and 256 respectively in this experiment. In addition, the Bi-GRU uses a dynamic recurrent neural network structure; and its maximum acceptable length is manually determined, which is 20 in this experiment. The last hidden layer state of the Bi-GRU is passed to a fully connected layer. The output dimensions of the fully connected layers are all 14, which are corresponding to the number of place categories selected in this experiment. The fusion layer fuses the foregoing outputs by multiplying the elements of the corresponding positions of two vectors, and performs data fine-tuning by using a fully connected layer. Finally, data is input to the softmax classification layer, to obtain confidence corresponding to the different place categories.

In the training process, a set containing at least one piece of triple knowledge is obtained after each training sample is subjected to the operations in steps 1.1 and 1.2. Further, the description entities are subjected to pruning and padding operations according to the maximum acceptable length, and the place category labels are denoted as a one-hot code vector, to finally form a training data set. The training process adopts a manner of minimizing a cross entropy loss function and a triplet loss function, and uses the Adam optimizer for optimization. An initial value of the learning rate is 0.002 and the cosine decay method is implemented to decay the learning rate. The whole training process lasted for 200 epochs and then stops.

In the test process, samples for subsequent inference are also subjected to the foregoing same operations, only excluding the place category labels. After the sample is input to the inference model, a confidence vector of this sample for all place categories can be obtained. A place category corresponding to a maximum confidence is selected, which is the inference result.

2. Experimental Result

Figure 3:
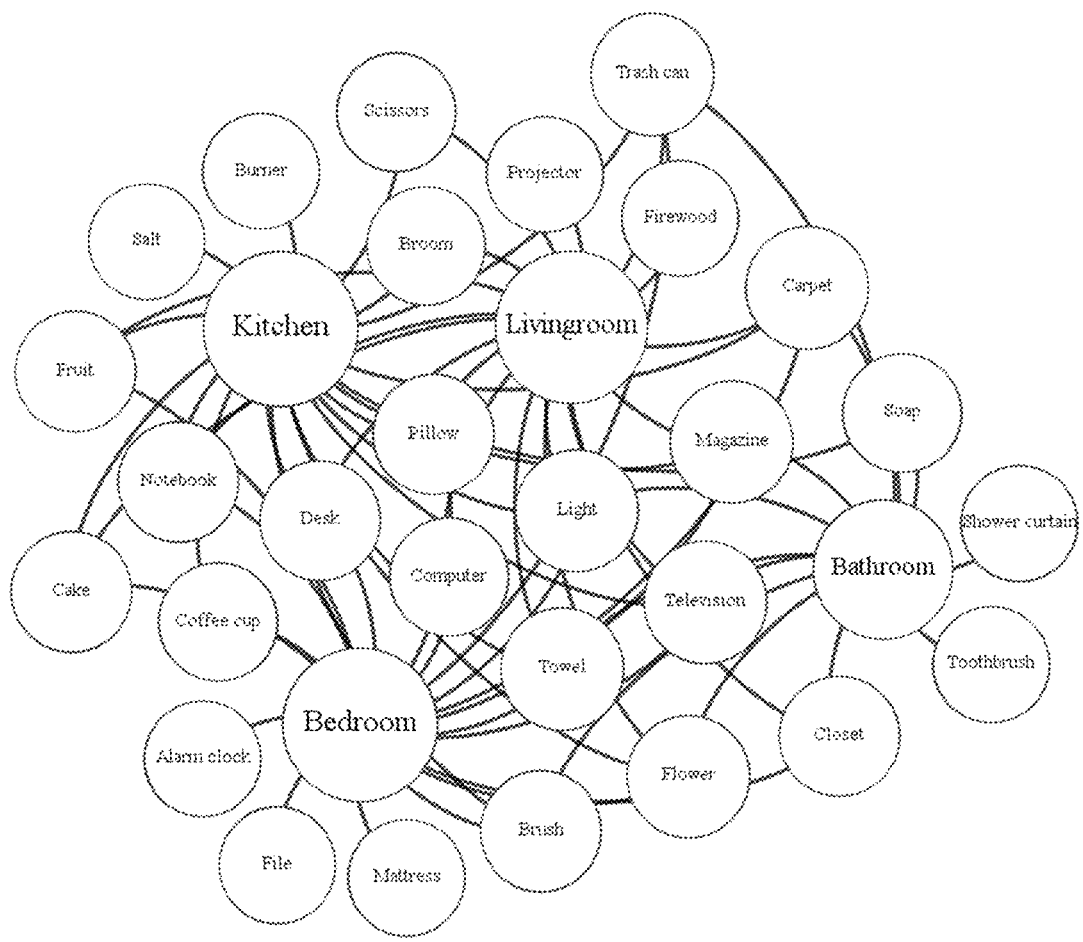
FIG. 3 is a schematic diagram of a visualized place knowledge graph (a part) of the present disclosure.

Results of this experiment are obtained by execution according to the experiment process described in section 1. The experimental environment is a Windows system with an Intel i5-4590 CPU and 12 GB RAM, the neural network structure is written using the TensorFlow 1.15 function library, and the code is written in Python language. This experiment selects 14 categories of places for test, and experimental results are shown in Table 1. It can be seen through analysis and comparison of the recognition rates that the method of the present disclosure can effectively realize place recognition. Further, because the place knowledge graph is constructed, semantic elements of different places can be directly acquired, so that people can conveniently and intuitively understand the composition of the place. FIG. 3 shows a partial visualized result of the place knowledge graph, where the probability values are shown in connecting edges and are omitted for simplicity.

TABLE 1

Results of sample distribution and recognition rates of 14 categories of places

| Place categories | Training samples | Test samples | Number of correctly recognized samples | Recognition rates |
| --- | --- | --- | --- | --- |
| Airport terminal | 114 | 13 | 12 | 92.31% |
| Art studio | 95 | 11 | 9 | 81.82% |
| Bathroom | 652 | 73 | 72 | 98.63% |
| Bedroom | 1402 | 156 | 137 | 87.82% |
| Meeting room | 193 | 22 | 15 | 68.18% |
| Corridor | 123 | 14 | 14 | 100.00% |
| Dining room | 470 | 53 | 43 | 81.13% |
| Playroom | 95 | 11 | 7 | 63.64% |
| Hotel room | 206 | 23 | 18 | 78.26% |
| Kitchen | 735 | 82 | 75 | 91.46% |
| Living room | 900 | 101 | 90 | 89.11% |
| Poolroom | 121 | 14 | 13 | 92.86% |
| Street | 266 | 30 | 30 | 100.00% |
| Waiting room | 96 | 11 | 10 | 90.91% |
| Total | 5468 | 614 | 545 | — |
| Average value | — | — | — | 88.76% |

The above merely describes preferred embodiments of the present disclosure. It should be noted that, several improvements and modifications may be made by those of ordinary skill in the art without departing from the principle of the present disclosure, and these improvements and modifications should also be construed as falling within the protection scope of the present disclosure.

What is claimed is:

1. A place recognition method based on knowledge graph inference, comprising the following steps:
   step 1) acquisition of basic semantic data:
   the basic semantic data describing items contained in a specific place, events, and special semantic concepts associated with the place, and there being the following two acquisition ways: during construction of a place knowledge graph and training of an inference model, annotating various information manually by using natural language description, including at least one of images, sound, distances, and voice, collected in a place environment, so as to obtain the basic semantic data and a corresponding place category; and on the other hand, in a place recognition and inference process, automatically generating the semantic data by an existing semantic generation model according to types of heterogeneous information;
   step 2) generation of place description entities
   by using natural language processing methods for text segmentation, removal of stop words, entity extraction, lemmatization, and manual screening, preprocessing the basic semantic data, wherein natural language text obtained after screening contains description entities in the place knowledge graph;
   step 3) construction of the place knowledge graph
   counting the occurrence frequencies of the place description entities in an actual application environment, to obtain a frequency of each description entity in a specific place, and then performing normalization to obtain a probability value, to finally form the place knowledge graph having a basic triple structure of description entities-place categories-probability values; and step 4) inference from the place knowledge graph learning the knowledge graph by using a Deep Neural Network (DNN), wherein its objective task is to perform training according to triple sets of the knowledge graph, so that the DNN has a function of inferring the place category according to a knowledge set of description entities-probability values; during implementation of inference, automatically extracting description entities from a place information source according to steps 1) and 2), and further performing entity matching with the knowledge graph in step 3); and then making inference by using a well-trained DNN from a knowledge set obtained after the matching, thus realizing place recognition.

2. The place recognition method based on knowledge graph inference according to claim 1, wherein the acquisition of the basic semantic data in step 1) comprises the following sub-steps:

1-1) in an actual application environment, the place information being collected by an intelligent device via a sensor, and original information being expressed with at least one of images, videos, sound, and distances; first, describing the foregoing information in natural language by means of manual annotation, wherein description content comprises semantic concepts, names of things, events, or human behavior or states that are contained in the information, so as to form the basic semantic data; and 1-2) in the inference process, automatically generating the basic semantic data by the existing semantic generation network according to specific information types, wherein training data for the network is provided in sub-step 1-1).

3. The place recognition method based on knowledge graph inference according to claim 1, wherein the generation of the place description entities in step 2) comprises the following sub-steps:

after acquisition of the basic semantic data in step 1), requiring preprocessing by using natural language processing methods: first, segmenting the semantic data to obtain word units each having a minimal semantic concept; then, performing word deletion according to a stop word list; further performing entity extraction for the screened word units, wherein an extraction principle is: reserving word units each having a minimal semantic concept according to the thing names, events, actions, or states, such units generally having the attributes of nouns or verbs and being able to affect the judgment on the place category; and finally, performing lemmatization for the extracted entities, to lemmatize words in terms of verb tense, person, and noun plural, wherein through the foregoing steps, a description entity dictionary is formed, which is able to be stored, added, deleted, and modified.

4. The place recognition method based on knowledge graph inference according to claim 1, wherein the construction of the place knowledge graph in step 3) comprises the following sub-steps:

first, collecting sample statistics on the number of occurrences of each description entity in an actual application environment according to the description entity dictionary obtained in step 2). Let $n_{i,j}$ denote the number of occurrences of the i-th description entity in the dictionary in all samples regarding category-j places and let $m_j$ denote a total number of the samples regarding the category-j places, to obtain the following calculation formula of a description entity frequency value $f_{i,j}$: $f_{i,j}=n_{i,j}/m_j$, if the i-th description entity does not occur in the samples regarding the category-j places in the statistical process, assigning a minimal value to the frequency $f_{i,j}$, that is, $f_{i,j}=\sigma(\sigma<10^{-3})$; performing normalization for frequency values of all the description entities in places of the same category, that is, $$\sum_i F(f_{i,j}) = 1,$$

wherein the function $F(\cdot)$ denotes a normalization method, to finally obtain an entity occurrence probability value $p_{i,j}$, and preferably, $$\sum_i p_{i,j} = 1$$

is established by using $$p_{i,j} = \frac{f_{i,j}}{\sum_i f_{i,j}},$$

to calculate the probability value; and thus, constructing the place knowledge graph, wherein a basic triple structure thereof is description entities-place categories-probability values, which is specifically expressed as: the i-th description entity-place category j-occurrence probability $p_{i,j}$; in addition, triples corresponding to the probability values of $p_{i,j}<10^{-2}$ are not recorded in the knowledge graph, and corresponding modification or deletion is also synchronously made in the description entity dictionary in step 2); and moreover, two new entities: placeholder and unknown character, are added to the description entity dictionary in step 2), wherein the former one does not have any semantic concept and is only used for data padding in an inference model; and the latter one is semantic data acquired in step 1), is not stored in the description entity dictionary in step 2), and indicates that the entity concept is unknown.

5. The place recognition method based on knowledge graph inference according to claim 1, wherein the inference from the place knowledge graph in step 4) comprises the following sub-steps:

4-1) in the training process, combining the entity dictionary and place categories into a new dictionary, which is denoted by a one-hot code vector; and designing a DNN inference model by using a set of description entities-probability values of the samples as the input and the place categories as the output; and 4-2) in the inference process, performing entity matching between the set of description entities of the samples acquired in step 2) and the knowledge graph constructed in step 3), to obtain a set of description entities-probability values; and then inputting the set into the well-trained inference model in sub-step 4-1), to finally obtain place category knowledge.

6. The place recognition method based on knowledge graph inference according to claim 3, wherein the description entity dictionary comprises the following two sets: an object set and an action state set; elements in the object set are words corresponding to real objects, and elements in the action state set are words corresponding to interactions between humans and objects or between humans, and certain states of humans or produced events; and other semantic words are not included in the description entity dictionary.

7. The place recognition method based on knowledge graph inference according to claim 5, wherein the DNN inference model has the following structure or steps:
   the neural network structure at least comprises: an embedding vector fully connected layer, used for realizing mapping from a one-hot code to a dense vector; a recurrent neural network or its variant structure, used for realizing integration and fusion of the set of description entities-probability values; and a softmax layer, used for calculating a classification probability of place categories.

* * * * *